United States Patent [19]

Katoh et al.

[11] Patent Number: 5,077,082

[45] Date of Patent: Dec. 31, 1991

[54] METHOD OF TREATING SURFACE OF SHAPED BODY FORMED OF POLYPROPYLENE RESIN

[75] Inventors: Koichiroh Katoh, Abiko; Tatasuyuki Mitsuno, Ichihara; Hideo Shinonaga, Chiba; Akio Daimon, Ichihara, all of Japan

[73] Assignees: Director-General of Agency of Industrial Science and Technology; Sumitomo Chemical Co., Ltd., both of Japan

[21] Appl. No.: 506,085

[22] Filed: Apr. 9, 1990

Related U.S. Application Data

[63] Continuation-in-part of Ser. No. 243,272, Sep. 12, 1988, abandoned.

[30] Foreign Application Priority Data

Sep. 19, 1987 [JP] Japan ................................ 62-234406

[51] Int. Cl.$^5$ ............................................. B05D 3/06
[52] U.S. Cl. ................................... 427/54.1; 427/307; 427/322; 427/444; 264/22
[58] Field of Search ..................... 427/54.1, 307, 322, 427/444; 264/22

[56] References Cited

U.S. PATENT DOCUMENTS

| | | | |
|---|---|---|---|
| 4,465,715 | 8/1984 | Manabe et al. | 427/38 |
| 4,724,057 | 2/1988 | Ebisawa | 427/40 |
| 4,820,580 | 4/1989 | Hacker et al. | 427/243 |
| 4,824,699 | 4/1989 | Woo et al. | 427/35 |
| 4,840,851 | 6/1989 | Golander | 427/44 |

*Primary Examiner*—Michael Lusignan
*Attorney, Agent, or Firm*—Lorusso & Loud

[57] ABSTRACT

A shaped body formed of a polypropylene resin is surface-treated by a method which includes the steps of:

providing a shaped body formed of a composition containing (A) 5-95% by weight of a specific propylene-ethylene block copolymer and (B) 5-95% by weight of a specific ethylene-propylene copolymer rubber;

contacting a surface of the shaped body with a UV-ray absorbing liquid at a temperature and for a period of time sufficient to swell the surface; and irradiating UV rays having wavelengths of 300 nm or less on the swollen surface thereby increasing the surface energy of the surface of the shaped body. The thus treated shaped body is ready for coating with a coating material.

9 Claims, No Drawings

METHOD OF TREATING SURFACE OF SHAPED BODY FORMED OF POLYPROPYLENE RESIN

CROSS-REFERENCE TO RELATED APPLICATION

This application is a continuation-in-part of U.S. Ser. No. 07/243,272 filed Sept. 12, 1988, now abandoned.

BACKGROUND OF THE INVENTION

This invention relates to a method of treating the surface of a shaped body formed of a polypropylene resin.

Excellent mechanical and physical properties of polypropylene resins allow the use thereof for interior or exterior decorative applications in, for example, automobile parts such as instrument panels, trims, pillars and bumpers and domestic electric appliances such as vacuum cleaners.

However, because of their non-polar, highly crystalline nature, the polypropylene resins pose a problem of difficulty in coating, printing, bonding and the like surface processing. To cope with this problem, there have been proposed the following pretreating methods: primer coating, sand blast treatment, chromic acid treatment, flame treatment, corona discharge treatment, plasma treatment, functional groups-introducing treatment and photo-grafting treatment. These conventional methods, however, are not entirely satisfactory for the reasons as set forth below.

The primer coating method includes applying a coating of a primer composition, such as a toluene solution of a chlorinated polypropylene, over the surface of a shaped polypropylene article. Primer compositions are generally expensive. Further, the primer coating is effective to only specific types of coating materials to be used in succeeding main treatment steps.

The sand blast method is one in which granules of a grinding material are caused to impinge on a surface of a shaped body to be treated for roughening same. The granular grinding material causes fouling of the working environment and the product. The surface of the treated product is, therefore, required to be washed with water. Further, there are caused problems that the treatment makes the surface to be treated opaque and that the grinding material once cut into the surface to be treated cannot be easily removed.

The treatment with chromic acid mixture includes heating the chromic acid mixture, which, for instance, contains 75 parts of potassium bichromate, 120 parts of water and 1500 parts of concentrated sulfuric acid, to about 100° C., and immersing a shaped body to be treated in the heated mixture for 10 about 5 minutes. This method requires high cost for the treatment of the waste chromic acid mixture.

The flame treatment includes exposing the surface of a shaped body to be treated to an oxidizing flame with a temperature of 1000–2500° C. produced by combustion of a fuel gas at an excess air ratio. The treated surface is liable to be distorted or melted by the heat.

The corona discharge treatment includes passing a film or a film-like body to be treated through a space between two opposing electrodes while applying a high electric voltage therebetween. This method is not applicable only to flat bodies.

The plasma treatment includes exposing the surface of a plastic body to be treated to a low temperature plasma, so that the surface undergoes a chemical change by the action of dissociated oxygen and ultraviolet rays. Plasma of oxygen or air is used. This method is disadvantageous because of the necessity of an expensive apparatus.

The functional group-introducing method includes irradiating UV rays on the surface of a shaped body to be treated in an atmosphere of chlorine gas, and then treating the irradiated surface with an alkali. This method poses a problem of handling very dangerous chlorine gas.

The photo-grafting method includes admixing benzophenone with polypropylene powder, forming the admixture into a film, and photo-treating the surface of the film in the presence of acrylamide in an oxygen-free atmosphere for photochemically graft-copolymerizing the acrylamide with the polypropylene. This method requires complicated steps and, therefore, is economically disadvantageous.

SUMMARY OF THE INVENTION

The present invention has been made with the above-described problems of the conventional methods in view and provides a novel method for increasing the surface energy of a shaped body formed of a polypropylene resin.

In accordance with the present invention there is provided a method of treating the surface of a shaped body, comprising the steps of:

providing a shaped body formed of a composition containing (A) 5–95 % by weight of a propylene-ethylene block copolymer which contains 3–15 % by weight of ethylene, which has a melt index of 10–30 g per 10 minutes and which includes a polypropylene block and an ethylene-propylene copolymer block having an ethylene content of 30–60 % by weight and showing an intrinsic viscosity of 3–10 dl/g in a tetralin solution at 135° C. and (B) 5–95 % by weight of an ethylene-propylene copolymer rubber which contains 40–80 % by weight of ethylene and which has a Mooney viscosity ($ML_{1+4}$ 100° C.) of 20–60;

contacting a surface of the shaped body with a UV-ray absorbing liquid at a temperature and for a period of time sufficient to swell the surface; and irradiating UV rays having wavelengths of 300 nm or less on said swollen surface thereby increasing the surface energy of said surface of the shaped body.

It has been found that when a polypropylene resin having the above-specified, specific composition and specific properties is formed into a shaped body and when the shaped body is treated with UV rays after contact with a UV ray-absorbing liquid, the resulting shaped body exhibits excellent surface properties suitable for coating with a coating material such as an urethane coating material without adversely affecting excellent physical properties inherent to polypropylene resins, such as heat-resisting properties and impact resistance.

DESCRIPTION OF PREFERRED EMBODIMENTS

The propylene-ethylene block copolymer (A) to be used as one of the components of a polypropylene resin composition for forming the shaped body to be treated is obtained by copolymerizing (a) a polypropylene produced by polymerizing propylene in the presence of, for example, a Ziegler-Natta catalyst with (b) an ethylene-propylene copolymer obtained by copolymerization of ethylene and propylene. The block copolymer (A) is thus composed of a homopolymer segment or block ($A_1$) consisting of propylene and a copolymer segment or block ($A_2$) consisting of propylene and ethylene.

The block copolymer (A) should have a melt index of 10–30 g per 10 minutes and an ethylene content of 3–15 % by weight. A melt index of the block copolymer (A) of below 10 g per 10 minutes is disadvantageous because the appearance, such as gloss and freeness of flow mark, of the resulting shaped body becomes poor. On the other hand, too large a melt index in excess of 30 g per 10 minutes causes reduction of the impact strength. An ethylene content outside of the above-specified range is unsuitable because of reduction of the impact strength of the shaped body. The melt index and the ethylene content of the block copolymer (A) are preferably 15–20 g per 10 minutes and 5–10 % by weight, respectively.

The copolymer block ($A_2$) of the block copolymer (A) should show an intrinsic viscosity of 3–10 dl/g in a tetralin solution at 135° C. When the viscosity is below 3 dl/g, the impact strength of the shaped body becomes poor. When the viscosity is above 10 dl/g, on the other hand, the shaped body becomes poor in appearance. The intrinsic viscosity of the copolymer block ($A_2$) in a tetralin solution at 135° C. is preferably 4–8 dl/g. The ethylene content of the copolymer block ($A_2$) should be in the range of 30–60 % by weight in order to obtain suitable impact strength of the shaped body. Preferably, the ethylene content of the copolymer block ($A_2$) is 40–55 % by weight.

The ethylene-propylene copolymer rubber (B) to be used in the present invention should have an ethylene content of 40–80% by weight and a Mooney viscosity ($ML_{1+4}$ 100° C.) of 20–60. An ethylene content outside of the above range causes reduction of the impact strength of the shaped body. A Mooney viscosity of below 20 also causes reduction of mechanical properties. When the Mooney viscosity exceeds 60, the shaped body becomes poor in appearance.

In the resin composition for the fabrication of the shaped body to be treated, it is important that the amount of the propylene-ethylene block copolymer (A) should be 5–95% by weight and that of the copolymer rubber (B) should be 5–95% by weight. A content of the copolymer rubber (B) of at least 5% by weight is necessary in order to obtain a shaped body whose surface can be treated to a state suitable for coating with a coating material such as an urethane coating material. A content of the copolymer rubber (B) in excess of 95% by weight is undesirable because the shaped body becomes poor in appearance. Preferably, the weight ratio of the block copolymer (A) to the copolymer rubber (B) is 1:9 to 9:1, more preferably 1:4 to 4:1.

For reasons of improved rigidity, heat resistance and impact resistance, it is preferred that the resin composition for the preparation of the shaped body to be treated further contain a fine particulate filler. Both inorganic and organic fillers may be used. Illustrative of suitable inorganic fillers are calcium carbonate, talc, clay, silica, diatomaceous earth, alumina, zinc oxide, magnesium oxide, mica, calcium sulfite, calcium sulfate, calcium silicate, glass powder, glass fiber inclusive of silane-treated glass fiber, asbestos and gypsum fibers. Illustrative of suitable organic fillers are wood powder, cellulose fibers and melamine powder. These fillers may be used by themselves or as a mixture of two or more. Above all, the use of talc with an average particle size of 0.1–10 μm or mica with an average particle size of 0.5–5 μm is preferred.

It is preferred that these fillers be chemically pretreated before incorporation into the resin composition so as to enhance their properties to improve the rigidity, impact resistance and heat resistance of the shaped body obtained from the resin composition. Examples of surface treating agents include organic silane compounds such as vinyltriethoxysilane, vinyl-tris(β-methoxyethoxy)silane, α-aminopropyltrimethoxy-silane, α-aminopropyltriethoxysilane, α-metacryloxypropyltrimethoxysilane, N-(β-aminoethyl)α-aminopropyltrimethoxysilane and α-glycidoxymethoxysilane.

The filler or its surface-treated product may be used in an amount of 5–40 % by weight, preferably 10–40 % by weight based on the weight of the composition. At least 5 % by weight is necessary to obtain the above-described effects. On the other hand, too large an amount of the filler causes reduction of impact resistance of the shaped body obtained. When using the filler, the amounts of the propylene-ethylene block copolymer (A) and the ethylene-propylene copolymer rubber are preferably 30–90 % by weight and 5–30 % by weight, respectively.

The composition may further include an elastomer such as a styrene elastomer (e.g. styrene-butadiene random copolymer, styrene-butadiene block copolymer or a hydrated product thereof), a polyolefin elastomer (e.g. non-crystalline ethylene-propylene-nonconjugated diene copolymer or polyisobutyrene), or a functional group-containing polyolefin such as glycidyl group-containing ethylene copolymer. If desired, an antioxidant, a weather-proofing agent, an antistatic agent, a blowing agent, a coloring agent or the like additives may be also incorporated into the composition.

The resin composition may be shaped or molded into a suitable form, such as a film, a plate, a fiber or a rod, in any known manner using, for example, a banbury mixer, an extruder of a uniaxial or a biaxial screw type or a roll mill.

The thus prepared shaped body formed of a specific polypropylene resin is then contacted with a UV-absorbing liquid and, thereafter, subjected to irradiation by UV rays.

Thus, a surface to be treated of the shaped body is first treated with a UV ray-absorbing organic liquid at a temperature for a period of time sufficient to swell the surface with the organic liquid. The UV ray-absorbing organic liquid may be an organic solvent capable of absorbing a UV ray having a wave length of 300 nm or less. Examples of such organic solvents include aromatic hydrocarbons such as benzene, xylene and toluene, chlorinated aliphatic hydrocarbons such as carbon tetrachloride, trichloroethane, tetrachloroethylene and trichloroethylene, acrylic esters such as methyl acrylate, and acrylic amides such as acrylamide. Solutions of photosensitizers in the above organic solvents may also be used as the UV ray-absorbing liquid. Examples of the photosensitizers include acetophenone or its derivatives, benzophenone or its derivatives, benzoin or its derivatives, sulfids and onium salts. Above all, the use of a chlorinated hydrocarbon, especially tetrachloroethylene, trichloroethylene or a mixture of tetrachloroethylene and carbon tetrachloride is preferred because of its high swelling properties.

The contact of the surface of the shaped body to be treated with the UV ray-absorbing liquid may be effected by immersion or any suitable coating method such as spray coating. The contact is preferably performed at a temperature in the range from 20° C. to the boiling point of the UV-absorbing liquid for a period of time from 5 seconds to 10 minutes, more preferably in the range from 50° C. to a temperature lower by 5° C. than the boiling point for a period of time from 5 seconds to 5 minutes. By this contact, the organic liquid penetrates into amorphous portions of the surface of the shaped body, thereby to swell or etch the surface.

The swelling may be effected by contacting the surface to be treated with the UV ray-absorbing organic liquid heated to a suitable temperature. However, it is preferred that the swelling step be conducted by first heating the surface of the shaped body to be treated to a temperature of 30° C. or more and then contacting the heated surface with the UV ray-absorbing organic liquid maintained at a temperature lower by 10-80° C. than that of the heated surface by any suitable cooling means. By this, vaporization of the organic liquid can be minimized without lowering the swelling efficiency. The preheating of the surface to be treated may be effected by any known means such as an infrared lamp, an electric heater, a microwave generator, a high frequency generator or an oven.

The shaped body whose surface to be treated has been thus swollen by contact with the UV ray-absorbing liquid is then subjected to a UV irradiation treatment, so that the surface of the shaped body is activated and is converted to a state suitable for coating. Since the UV ray-absorbing liquid in the swollen surface of the shaped body vaporizes with time, the UV irradiation is desired to be performed before lapse of a long period of time, preferably within 1 minute after the completion of the swelling treatment.

As a source of the UV rays, there may be used a low pressure or a medium pressure mercury lamp having an envelope made of a synthetic quartz glass and capable of emitting UV rays with wave lengths of 300 nm or less. It is preferred that the wave length of the UV ray to be irradiated on the swollen surface be concentrated to 1849 Å. It is also preferable to use a UV source capable of generating UV rays with a high intensity. The UV irradiation is preferably performed at a temperature of 30-60° C. for a period of time of from 20 seconds to 10 minutes, more preferably 0.5-5 minutes.

The shaped body which has undergone the foregoing UV treatment is then subjected, as such or after the removal of static electricity, to coating or any other desired processing. Preferred coating materials include acrylic coating materials and urethane coating materials. Examples of urethane coating materials include those of acrylic urethanes, polyester urethanes and modified urethanes.

The method of the present invention is suitably applied for the preparation of the following shaped articles:

1) automobile exterior parts such as bumpers and bumper corners;
2) automobile interior parts such as instrument panels, meter cases, glove boxes, console boxes, trims and pillars;
3) motorcycle parts such as fenders and leg seals; and
4) parts of domestic electric appliances such as laundry machine covers, vacuum cleaner bodies and electric fan stands or frames.

The method of the present invention has the following advantages:

1) The coated surface of the shaped body is smooth and beautiful and the coats are strongly bonded to the shaped body;
2) The method does not require priming;
3) The method is simple and economical and does not require a long treatment time or complicated steps;
4) The method can be effected using a simple and inexpensive apparatuses;
5) The method does not cause deformation or melt of the surface to be treated; and
6) The method is applicable to shaped bodies having any shape.

The following examples will further illustrate the present invention.

EXAMPLE 1

A mixture containing 70 parts by weight of a propylene-ethylene block copolymer (hereinafter referred to as PP-2), 30 parts by weight of an ethylene-propylene copolymer rubber (hereinafter referred to as EPR-1), 0.2 part by weight of IRGANOX 1010 (registered trademark of Ciba-Geigy AG), 0.05 part by weight of calcium stearate and 0.05 part by weight of ULTRANOX 626 (registered trademark of Borg Warner Corp.) was melted and kneaded with a banbury mixer and the melt was shaped into pellets. PP-2 had a melt index of 20 g/10 minutes and an ethylene content of 7 % by weight. The ethylene-propylene copolymer block of PP-2 had an ethylene content of 47 % by weight and exhibited an intrinsic viscosity of 5 dl/g in a tetralin solution at 135° C. EPR-1 had an ethylene content of 50 % by weight and a Mooney viscosity ($ML_{1+4}$ 100° C.) of 45.

Using the above pellets, a plate was prepared using an injection molding machine. The plate was then immersed in benzene at 56° C. for 5 minutes. After being allowed to stand in the air for about 5 minutes, the plate was subjected to UV irradiation using a low pressure mercury lamp having a synthetic quartz glass envelope and emitting UV rays with a strong intensity at 1849 Å and 2537 Å. The irradiation was carried out in the air for 5 minutes with a distance between the lamp and the plate surface of 5 cm.

The resultant plate was then coated with MYCRON #3000 (acrylic coating material; registered trademark of CASHEW Co., Ltd.) by a spray coating method, and was baked at 60° C. for 30 minutes to obtain a coated plate having an initial bonding strength of 100 % and an Izod impact strength of 75 kg·cm/cm.

The bonding strength of the coat was determined as follows: The coated layer on the resin plate was cut with a razor into small squares each having a 2 mm side. An adhesive tape with 24 mm width (CELLOTAPE produced by Nichiban Co., Ltd.) was then applied on the coated layer while applying a pressure with fingers. Thereafter, the tape was peel off quickly. The number of cut squares of coated layer remaining on the plate was counted. The initial bonding strength was calculated as a percentage of the remaining squares on the basis of the number of the cut squares prior to peeling. The Izod impact strength was carried out at 23° C. in accordance with the Japanese Industrial Standards JIS K7110.

EXAMPLE 2

Example 1 was repeated in the same manner as described except that HI-URETHAN No. 5000 (acrylic urethane coating material; registered trademark of Nippon Oil and Fats Co., Ltd.) was used in place of MYCRON #3000 and the baking was performed at 80° C. for 40 minutes. The bonding strength of the resulting coated plate was 100 %.

EXAMPLE 3

Example 1 was repeated in the same manner as described except that R263 (polyester urethane coating material manufactured by Nippon Bee Chemical Co., Ltd.) was used in place of MYCRON #3000 and the baking was performed at 90° C. for 30 minutes. The bonding strength of the resulting coated plate was 100 %.

EXAMPLE 4

Example 1 was repeated in the same manner as described except that FLEXHANE #101 (urethane coating material; registered trademark of Nippon Bee Chemical Co., Ltd.) was used in place of MYCRON #3000 and the baking was performed at 120° C. for 30 minutes. The bonding strength of the resulting coated plate was 100 %.

EXAMPLE 5

Example 1 was repeated in the same manner as described except that the amounts of PP-2 and EPR-1 were changed to 60 parts by weight and 30 parts by weight, respectively and that 10 parts of talc having an average particle size of 3 μm was additionally incorporated into the resin mixture. The coated plate had an Izod impact strength of 60 kg cm/cm and a bonding strength of 100 %.

EXAMPLES 6-8

Example 2-4 were each repeated in the same manner as described except that the amounts of PP-2 and EPR-1 were changed to 60 parts by weight and 30 parts by weight, respectively and that 10 parts of talc having an average particle size of 3 μm was additionally incorporated into the resin mixture. The coated plates were found to have a bonding strength of 100 %.

EXAMPLE 9

A plate formed of the same polypropylene resin as that produced in Example 1 was immersed in a mixed solvent composed of 95 parts by volume of tetrachloroethylene and 5 parts volume of carbon tetrachloride at 60° C. for 1 minute. The plate was then subjected to UV irradiation using a low pressure mercury lamp having a synthetic quartz glass envelope and emitting UV with strong intensity at wavelengths of 1849 Å and 2537 Å. The UV-irradiation was carried out in air with a distance between the lamp and the plate surface of 15 cm. The resultant plate was then coated with FLEXHANE #101 (an urethane coating material; registered trademark of Nippon Bee Chemical Co., Ltd.) by a spray coating method, and was baked at 120° C. for 30 minutes to obtain a coated plate having an initial bonding strength of 100 %.

EXAMPLE 10

A talc-containing plate was prepared in the same manner as that described in Example 5 and subjected to a UV-treatment and urethane coating in the same manner as that in Example 9. The coated plate had an initial bonding strength of 100 %.

COMPARATIVE EXAMPLES 1-4

Example 1-4 were repeated in the same manner as described except that PP-2 and EPR-1 were replaced by polypropylene homopolymer having a melt index of 30 g/10 minutes to obtain coated plates of Comparative Examples 1-4, respectively. The coated plates were found to have an Izod impact strength of 3 kg cm/cm and bonding strengths of 65 % (Comparative Example 1), 80 % (Comparative Example 2), 93 % (Comparative Example 3) and 0 % (Comparative Example 4).

COMPARATIVE EXAMPLE 5

Example 9 was repeated in the same manner as described except that EPR-1 was not used for the production of a resin plate. The coated plate had an initial bonding strength of 65 %.

EXAMPLE 11

A talc-containing plate was prepared in the same manner as that described in Example 5. The plate was contacted with trichloroethane vapors at 74° C. for 30 seconds. After being allowed to stand in air for about 20 minutes, the plate was subjected to a UV-treatment for 2 minutes with a distance between the lamp and the plate of 15 cm. The resultant plate was then coated with R271 (urethane coating material manufactured by Nippon Bee Chemical Co., Ltd.) by a spray coating method, and was baked at 90° C. for 30 minutes. The coated plate had an initial bonding strength of 100 %.

What is claimed is:

1. A method of treating the surface of a shaped body, comprising the steps of:
    providing a shaped body formed of a composition containing (A) 5-95 % by weight of a propylene-ethylene block copolymer which contains 3-15 % by weight of ethylene, which has a melt per 10 minutes and which includes a polypropylene block and an ethylene-propylene copolymer block having an ethylene content of 30-60 % by weight and showing an intrinsic viscosity of 3-10 dl/g in a tetralin solution at 135° C. and (B) 5-95 % by weight of an ethylene-propylene copolymer rubber which contains 40-80 % by weight of ethylene and which has a Mooney viscosity, $ML_{1+4}$ 100° C., of 20-60;
    contacting a surface of the shaped body with a UV-ray absorbing liquid at a temperature and for a period of time sufficient to produce a swollen surface containing said UV-ray absorbing liquid; and
    irradiating said swollen surface with UV rays having wavelengths of 300 nm or less thereby increasing the surface energy of said surface of the shaped body.

2. A method as claimed in claim 1, wherein said composition further includes (C) 5-40 % by weight of a filler and wherein the contents of the propylene-ethylene block copolymer (A) and the ethylene-propylene copolymer rubber (B) are 30-90 % by weight and 5-30 % by weight, respectively.

3. A method as claimed in claim 2, wherein said filler is talc and/or mica with a particle size of 0.1-10 μm.

4. A method as claimed in claim 1, further comprising coating said UV-irradiated surface with an urethane coating material.

5. A method as claimed in claim 1, wherein said contacting step includes heating said surface to a temperature of 30° C. or more and then contacting said heated surface with the UV ray-absorbing liquid maintained at a temperature lower by 10–80° C. than that of said heated surface.

6. A method as claimed in claim 1, wherein said contacting is performed for 5–600 seconds and said irradiation is performed for 20–600 seconds.

7. A method as claimed in claim 1, wherein said contacting step is performed at a temperature in the range from 30° C. to the boiling point of said UV-absorbing liquid.

8. A method as claimed in claim 1, wherein said contacting step is performed at a temperature in the range from 50° C. to a temperature lower by 5° C. than the boiling point of said UV-absorbing liquid.

9. A method as claimed in claim 1, wherein said UV-absorbing liquid is a chlorinated aliphatic hydrocarbon.

* * * * *

UNITED STATES PATENT AND TRADEMARK OFFICE
CERTIFICATE OF CORRECTION

PATENT NO. : 5,077,082
DATED      : December 31, 1991
INVENTOR(S) : KATOH et al

It is certified that error appears in the above-identified patent and that said Letters Patent is hereby corrected as shown below:

ON THE TITLE PAGE

Under the "Inventors", the name "Tatasuyuki Mitsuno" should read --Tatsuyuki Mitsuno--.

Col. 1, line 53, delete "10".

Col. 5, line 2, "20°C" should read --30°C--.

Col. 7, line 52, before "with" insert --rays--.

Col. 8, line 37, after "melt" insert --index of 10-30g--.

Signed and Sealed this

Twenty-first Day of September, 1993

Attest:

BRUCE LEHMAN

Attesting Officer

Commissioner of Patents and Trademarks